(12) United States Patent
Thornton et al.

(10) Patent No.: US 12,500,774 B2
(45) Date of Patent: Dec. 16, 2025

(54) SYSTEMS AND METHODS FOR GENERATING AND IMPLEMENTING A REVERSIBLE HASH CIRCUIT

(71) Applicant: Anametric, Inc., Austin, TX (US)

(72) Inventors: Mitchell A. Thornton, Dallas, TX (US); Elena Rochelle Henderson, Norman, OK (US); Jessie Monique Henderson, Norman, OK (US); William V. Oxford, Austin, TX (US)

(73) Assignee: Anametric, Inc., Austin, TX (US)

( * ) Notice: Subject to any disclaimer, the term of this patent is extended or adjusted under 35 U.S.C. 154(b) by 86 days.

(21) Appl. No.: 18/483,120

(22) Filed: Oct. 9, 2023

(65) Prior Publication Data

US 2025/0007719 A1    Jan. 2, 2025

Related U.S. Application Data

(60) Provisional application No. 63/415,508, filed on Oct. 12, 2022.

(51) Int. Cl.
*H04L 9/32* (2006.01)
(52) U.S. Cl.
CPC .................... *H04L 9/3236* (2013.01)
(58) Field of Classification Search
CPC . H04L 9/3236; H04L 9/0643; H04L 2209/12; G06F 30/323; G06F 30/337; G06F 30/34; G06F 30/327; G06N 10/20
See application file for complete search history.

(56) References Cited

U.S. PATENT DOCUMENTS

| | | | |
|---|---|---|---|
| 8,667,436 B1 | 3/2014 | Garlapati et al. | |
| 9,460,253 B1 | 10/2016 | Delaye et al. | |
| 2011/0019814 A1* | 1/2011 | Hasting | H04L 9/0643 |
| | | | 714/E11.032 |
| 2017/0147303 A1 | 5/2017 | Amy et al. | |
| 2019/0132131 A1* | 5/2019 | Clements | H04L 9/3239 |
| 2023/0362128 A1* | 11/2023 | Eastlake, III | H04L 9/0869 |

FOREIGN PATENT DOCUMENTS

EP    4250178 A1 *   9/2023   ............. G06F 21/16

OTHER PUBLICATIONS

Thornton et al., "Spectral Techniques in VLSI CAD," Kluwer Academic Publishers, 2001, 265 pages.
Thornton et al., "ESOP-based Toffoli Gate Cascade Generation," 2007 IEEE Pacific Rim Conference on Communications, Computers and Signal Processing, 4 pages.

(Continued)

*Primary Examiner* — Mohammad W Reza
(74) *Attorney, Agent, or Firm* — Sprinkle IP Law Group

(57) ABSTRACT

Systems and methods for generating reversible hash circuits from irreversible hash functions are disclosed, along with reversible hash circuits generated using such systems and methods. Generally, embodiments may obtain a hash function and generate a reversible hash circuit by mapping that irreversible hash function to a reversible hash circuit that includes reversible elements such that the reversible hash circuit may be utilized to obtain the corresponding input values from output values of the hash function.

21 Claims, 15 Drawing Sheets

| $p$ | $q$ | $r$ |
|---|---|---|
| 0 | 0 | 0 |
| 0 | 1 | 0 |
| 1 | 0 | 0 |
| 1 | 1 | 1 |

(56) References Cited

OTHER PUBLICATIONS

Thornton, "Modeling Digital Switching Circuits with Linear Algebra," Morgan & Claypool (2014), 159 pages.
International Search Report and Written Opinion issued by the U.S. Patent and Trademark Office as the International Searching Authority (USPTO/ISA) for PCT Application No. PCT/US23/76349, mailed Mar. 5, 2024, 7 pages.
Tran, "Reversible Circuits Synthesis Based on EXOR-sum of Products of EXOR-sums," Portland State University, 2015, 23 pages.
International Preliminary Report on Patentability (IPRP) issued by the U.S. Patent and Trademark Office as the International Searching Authority (USPTO/ISA) for PCT International Application No. PCT/US23/76349, mailed Apr. 24, 2025, 6 pages.

\* cited by examiner

| INPUT 1 | INPUT 2 | OUTPUT |
|---------|---------|--------|
| 0 | 0 | 0 |
| 0 | 1 | 0 |
| 1 | 0 | 0 |
| 1 | 1 | 1 |

FIG. 4A

```
# Full .pla
.i 2 #Number of inputs
.o 1 #Number of outputs
.p 4 #Number of lines in file
00    0
01    0
10    0
11    1
.e #End of file
```

FIG. 4B

```
# Simplified .pla
.i 2 #Number of inputs
.o 1 #Number of outputs
.p 4 #Number of lines in file
0-    0
-0    0
11    1
.e #End of file
```

FIG. 4C

| p | q |
|---|---|
| 0 | 1 |
| 1 | 0 |
FIG. 5A
FIG. 5B
FIG. 5C
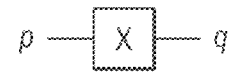
FIG. 5D
| p | q | r | s |
|---|---|---|---|
| 0 | 0 | 0 | 0 |
| 0 | 1 | 0 | 1 |
| 1 | 0 | 1 | 1 |
| 1 | 1 | 1 | 0 |
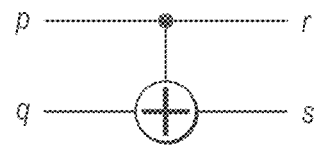
FIG. 6

| p | q | r | s | t | u | v | w |
|---|---|---|---|---|---|---|---|
| 0 | 0 | 0 | 0 | 0 | 0 | 0 | 0 |
| 0 | 0 | 0 | 1 | 0 | 0 | 0 | 1 |
| 0 | 0 | 1 | 0 | 0 | 0 | 1 | 0 |
| 0 | 0 | 1 | 1 | 0 | 0 | 1 | 1 |
| 0 | 1 | 0 | 0 | 0 | 1 | 0 | 0 |
| 0 | 1 | 0 | 1 | 0 | 1 | 0 | 1 |
| 0 | 1 | 1 | 0 | 0 | 1 | 1 | 0 |
| 0 | 1 | 1 | 1 | 0 | 1 | 1 | 1 |
| 1 | 0 | 0 | 0 | 1 | 0 | 0 | 0 |
| 1 | 0 | 0 | 1 | 1 | 0 | 0 | 1 |
| 1 | 0 | 1 | 0 | 1 | 0 | 1 | 0 |
| 1 | 0 | 1 | 1 | 1 | 0 | 1 | 1 |
| 1 | 1 | 0 | 0 | 1 | 1 | 0 | 0 |
| 1 | 1 | 0 | 1 | 1 | 1 | 0 | 1 |
| 1 | 1 | 1 | 0 | 1 | 1 | 1 | 1 |
| 1 | 1 | 1 | 1 | 1 | 1 | 1 | 0 |

```
.i 4
.o 4
.p 16
0000  1111
0001  1110
0010  1101
0011  1100
0100  1011
0101  1010
0110  1001
0111  1000
1000  0111
1001  0110
1010  0101
1011  0100
1100  0011
1101  0010
1110  0001
1111  0000
.e
```

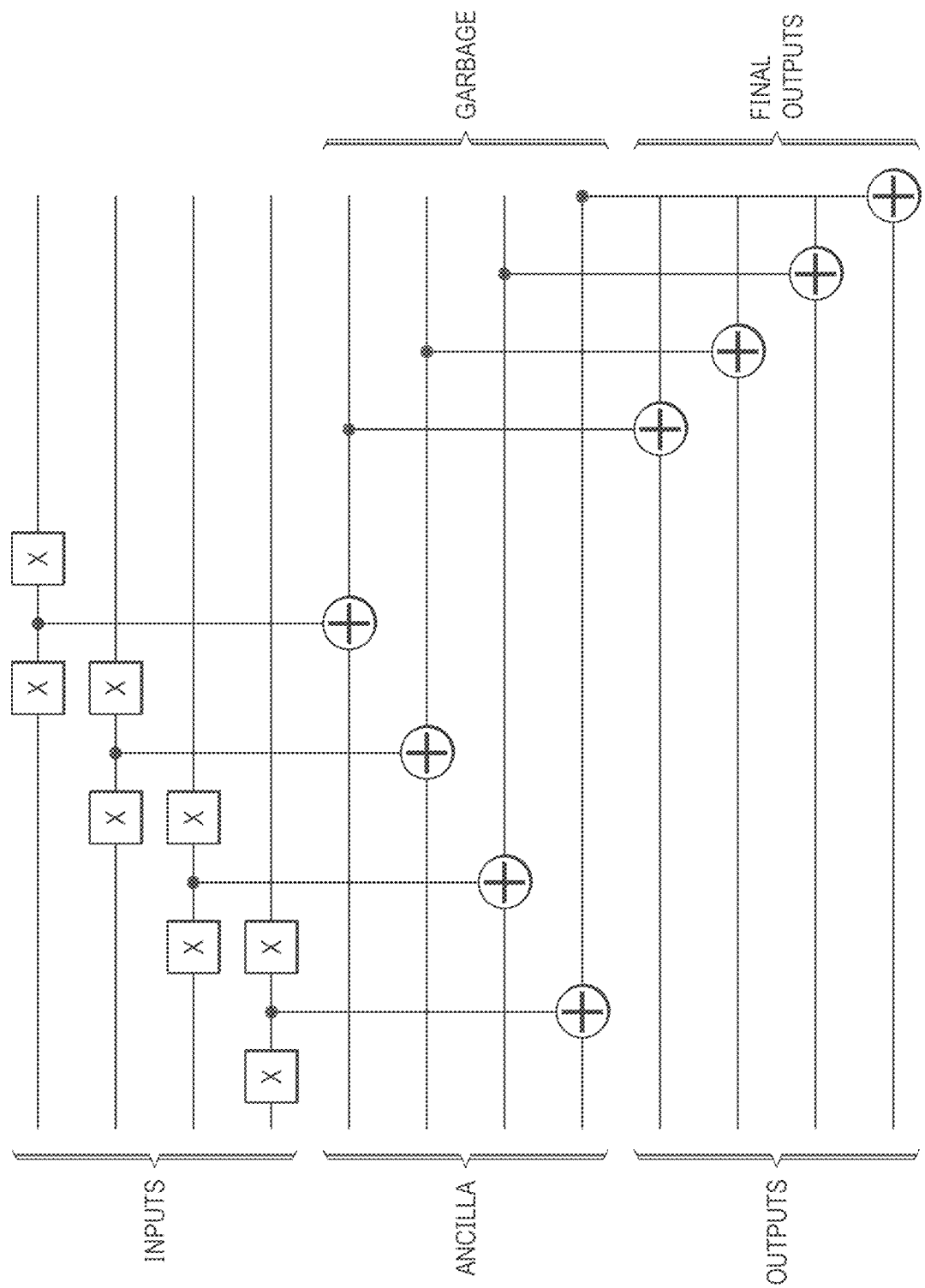

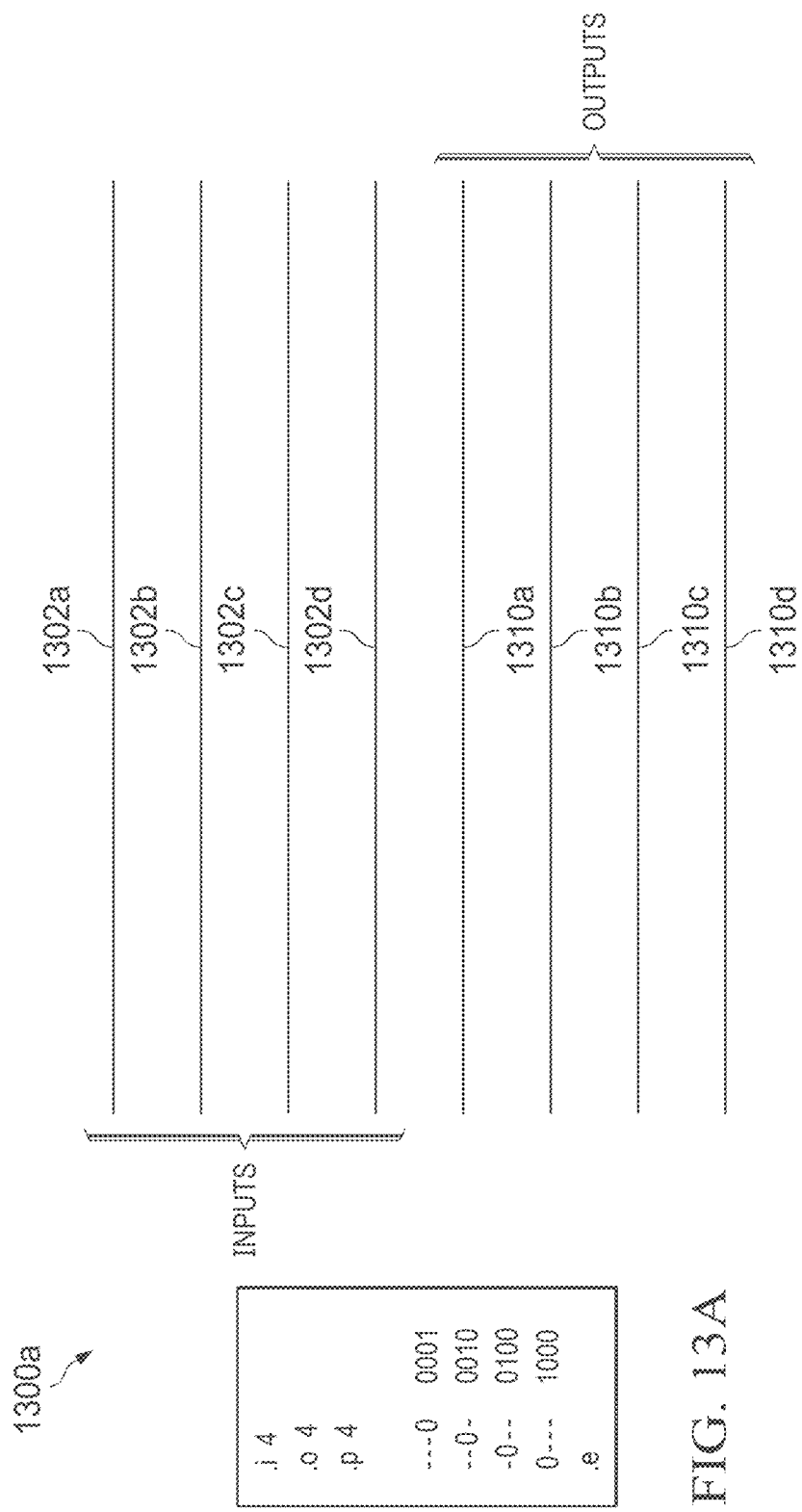

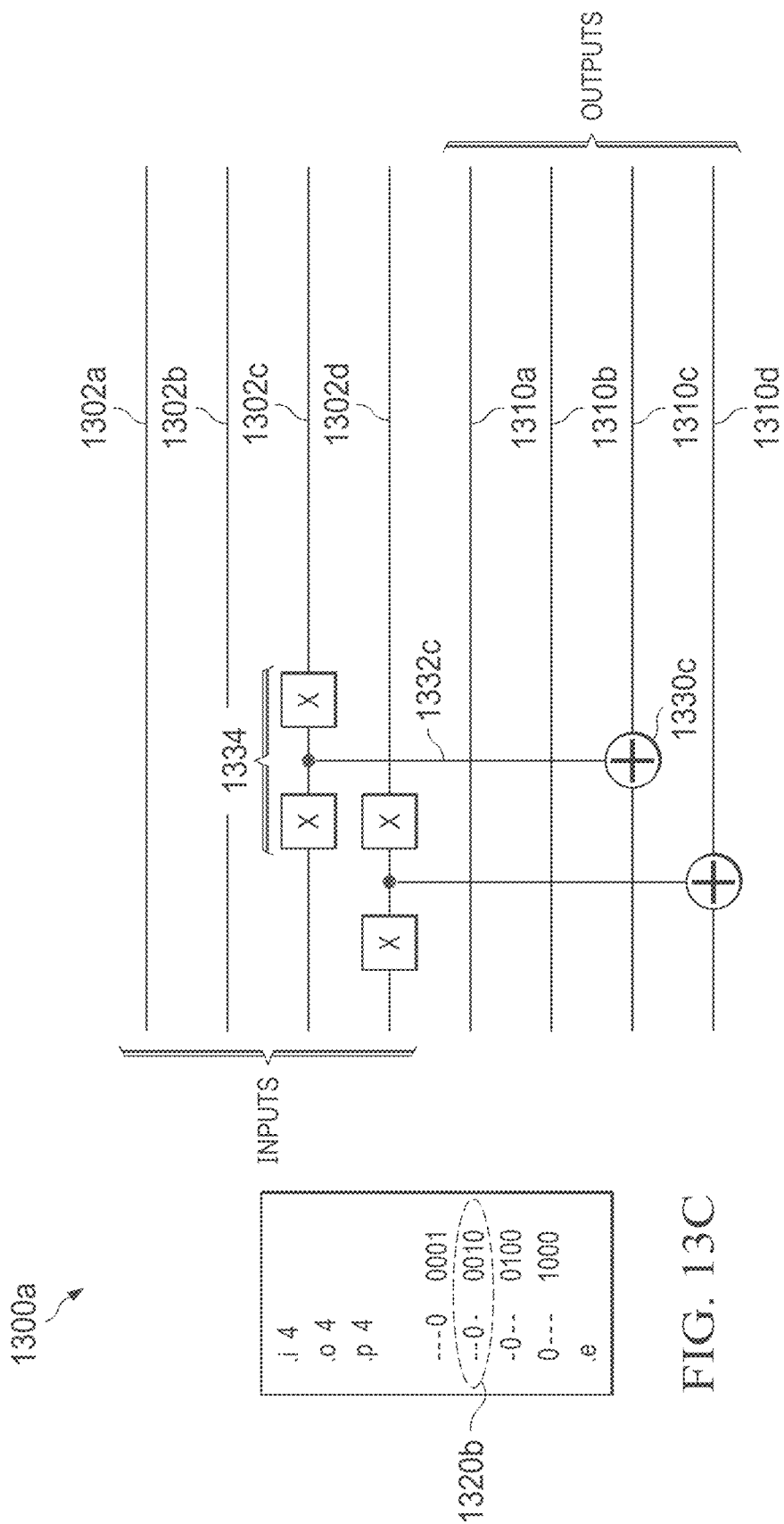

SYSTEMS AND METHODS FOR GENERATING AND IMPLEMENTING A REVERSIBLE HASH CIRCUIT

RELATED APPLICATIONS

This application claims a benefit of priority under 35 U.S.C. § 119 to U.S. Provisional Patent Application No. 63/415,508 filed Oct. 12, 2022, entitled "Systems and Methods For Computing An Inverse Hash Function", by Mitchell A. Thornton et al., which is hereby fully incorporated by reference in its entirety.

TECHNICAL FIELD

This disclosure relates generally to computer security. More particularly, this disclosure relates to embodiments of systems and methods for implementing a reversible hash function, including the generation, implementation or use of such a reversible hash function.

BACKGROUND

Hash functions transform inputs of one form to outputs of another via a mathematical function that, ideally, transforms every unique input to a unique output. Thus, hash functions may be thought of as data structures that store information through such a transformation. Robust hash functions—those that minimize collisions (differing inputs mapping to the same output), and that do not allow for straightforward retrieval of the inputs from the outputs—are useful cryptographic tools for encrypting data.

To illustrate in more detail, cryptographic hash functions are conventionally designed to be 'one way'. For such one way functions it is straightforward to move from input I/to output O. Conversely, for these one way functions it is very difficult to recover I when only O and the hash function are known. Consequently, such one-way hash functions are useful tools in cryptography because they can be used to encrypt data: once the information to be encrypted is sent through the hash function (e.g., as input I), the resulting output (O) is not easily transformed into the input. This process of moving from output to input is termed hash reversal, and efficient techniques for reversing cryptographically-sound hash functions have been widely researched.

Some of these techniques involve the use of quantum computers. Quantum computers differ from their classical counterparts in a number of important ways. One such difference is that some quantum circuit synthesis methods require reversible function specifications. Logically reversible circuits are those for which each output has a unique input. In other words, knowing solely the outputs and the function that was applied to generate the output allows for obtaining the inputs that generated the known outputs.

Thus, the process of hash reversal is of significant interest at least because of its cybersecurity ramifications, and its potential usefulness in developing algorithms for quantum computing. What is desired, therefore, are simple and efficient methods for generating and implementing reversible hash functions.

SUMMARY

With the above context in mind, some additional context with respect to hash functions, their reversibility and utilization may be useful. As discussed, it is desired to be able to determine and generate logically reversible circuits for hash functions, and to be able to use those reversible hash circuits to generate input values from output values for that hash function.

To those ends, among others, attention is now directed to embodiments of systems and methods for generating reversible hash circuits from (e.g., irreversible) hash functions are disclosed, along with reversible hash circuits generated using embodiments of such systems and methods. Generally, embodiments may obtain a hash function (e.g., formed from irreversible elements) and generate a reversible hash circuit by mapping that irreversible hash function to a reversible hash circuit that includes reversible elements. This reversible hash circuit may be utilized to obtain the corresponding input values from output values of the hash function.

Initially, a representation of a hash function may be obtained. The representation of the hash function can be transformed to a second representation of the hash function, where that second representation may represent the hash function utilizing a limited set of operations or gates (e.g., AND and Exclusive OR (XOR)). The second representation of the hash function can then be mapped to a set of reversible gates to generate the reversible hash circuit. To generate an original input value for the hash function from an output value, the output value for which it is desired to determine an input value can be selected and the reversible hash circuit may be run in reverse on the selected output value to generate the corresponding input value.

Accordingly, in one embodiment a first representation of a hash function can be obtained and this first representation of the hash function transformed to a second representation of the hash function. A reversible hash circuit for the hash function can then be generated by mapping the second representation of the hash function to a set of reversible gates comprising the reversible hash function.

In some embodiments, the first representation is a Programmable Logic Array (PLA), a netlist, or a decision tree. The second representation may be, for example, an Exclusive-Or-Sum-of-Products (ESOP) representation. The hash circuit can thus be minimized before the reversible hash circuit is generated.

Once the reversible hash circuit is generated it may be utilized to obtain an input value corresponding to a given output value by providing this given output value of the hash function as input to the reversible hash circuit and operating the reversible hash circuit in a reverse direction. This operation may be in the classical domain or the quantum domain. When the reversible hash circuit is operated in the quantum domain, the output value may comprise a set of output values, and the obtained input value may comprise multiple input values, wherein each input value corresponds to one of the set of output values.

As such, embodiments may provide systems and methods for efficiently generating reverse hash functions where such hash functions may have a number of applications which may be important (e.g., to the cybersecurity community). For example, participating in blockchain ecosystems (including cryptocurrency mining), decrypting website credentials, and impersonating cryptographic signatures all involve hashes. Embodiments as described herein may generate a circuit that directly calculates an inverse hash, thus bypassing the massive set of forward-hash computations involved in a brute-force search. Furthermore, embodiments may be especially suitable for tasks involving fixed size hashes—such as those used in blockchains—because the hash reversal circuit may not need to be resynthesized in real time.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIGS. 4A, 4B and 4C depict representations of a function.

FIGS. 5A, 5B, 5C and 5D depict representations of circuits.

FIG. 6 depicts a representation of a circuit.

FIG. 8 depicts an example circuit according to some embodiments.

FIGS. 9A and 9B depict representations of an example circuit according to embodiments.

FIGS. 13A-13E depict the generation and use of an example reverse hash function according to embodiments.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in detail, it may be helpful to give a general overview of certain aspects pertaining to embodiments. As may be recalled from the above discussion, hash functions transform inputs of one form to outputs of another via a mathematical function that, ideally, transforms every unique input to a unique output. Thus, hash functions may be thought of as data structures that store information through such a transformation. Some hash functions are designed to be one way and are thus useful tools in cryptography for encryption of data or other tasks. The process of reversing such hash functions is termed hash reversal and efficient techniques for such hash reversal are of interest in a variety of computing fields, including cryptography and quantum computing.

In particular, it is desired to be able to determine and generate logically reversible circuits for hash functions. For purposes of this disclosure, the terms circuit and function will be utilized substantially interchangeably, as it will be apparent to one of skill in the art how a physical circuit may be created in either the classical or the quantum domain from a description of a function, and how a circuit (e.g., either reversible or irreversible) implements, and can be described by, a function. Moreover, it will be noted that such circuits and functions may likewise be implemented in computer executable instructions without loss of generality. Thus, for example, embodiments may include a set of computer executable instructions that may be applied to a stored hash function (e.g., described or represented in a file or as a set of instructions for that hash function) to generate and store the inverse function of that hash function (e.g., described or represented in a file or as a set of instructions for that reversible hash function).

Figure 1:
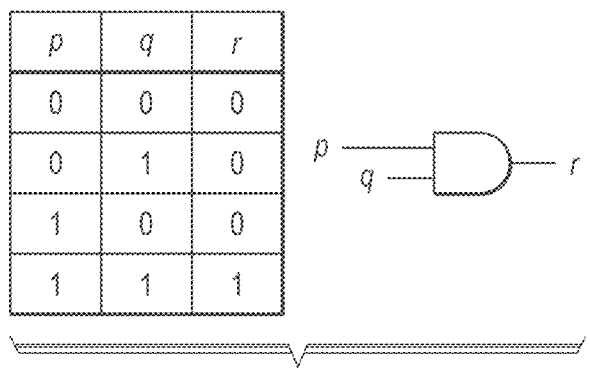
FIG. 1 is a block diagram of an example of an irreversible circuit.

In any event, logically reversible circuits are those for which each output has a unique input; in other words, knowing solely the outputs and the function that was applied to generate them allows for obtaining the inputs that generated the outputs. This reversibility can illustrate this by comparing two functions. Consider a two-input AND operation, which has the truth table and circuit diagram as depicted in the circuit of FIG. 1. Given an output r=0 and the information that an AND operation was applied, one cannot know what the inputs were, since there are three possible sets of inputs for an output of r=0:1) p=0 and q=0; 2) p=0 and q=1; and 3) p=1 and q=0. Consequently, the AND operation is not reversible.

Figure 2:
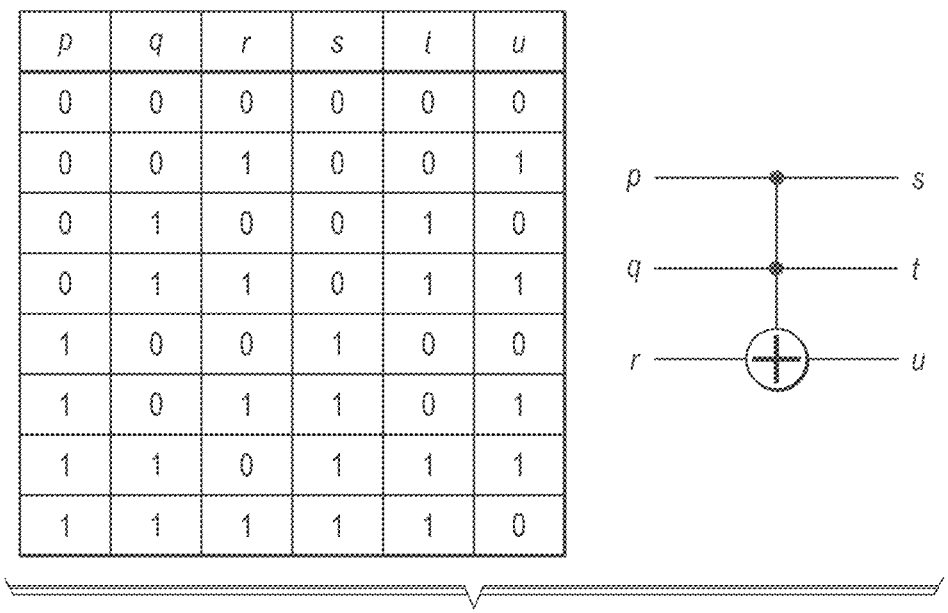
FIG. 2 is a block diagram of an example of a reversible circuit.

Contrast this with FIG. 2 depicting a reversible, three-input Toffoli circuit and associated truth table. Toffoli operation is a controlled operation, in which a NOT is applied to r if and only if both p and q are 1. (In other words, u=~r, if pp and q are both 1.) p and q are called the controls, and r is termed the target of the operation. The values of controls do not change (meaning s=p and t=q), but both values are included as outputs such that the operation is reversible. Thus, for example, if the outputs are s=1, t=1, and u=0, the only possible set of inputs is p=1, q=1, and r=1.

As illustrated by comparing the AND operation to the Toffoli operation in FIGS. 1 and 2, certain techniques for adding inputs and outputs may be utilized to generate an irreversible function from a reversible function. And since developing algorithms for quantum computers often involves designing reversible algorithms, techniques have been developed for transforming irreversible functions into reversible functions.

In particular synthesis, compilation, or optimization tools that transform functions from a representation suitable for synthesizing classically specified circuits into circuit descriptions appropriate for quantum computers have been developed. As discussed, quantum computers usually require reversible functions. Consequently, circuit synthesizers for use with quantum computers may include the ability to transform irreversible functions into reversible forms.

Such tools may be understood with reference to A. Sinha, E. R. Henderson, J. M. Henderson, and M. A. Thornton, "Automated Quantum Memory Compilation with Improved Dynamic Range." Proceedings of IEEE/ACM Third International Workshop on Quantum Computing Software (QCS), Dallas, TX, 2022; K. N. Smith and M. A. Thornton, "A quantum computational compiler and design tool for technology-specific targets," in 2022 IEEE International; Symposium on Computer Architecture (ISCA), 2019; Smith, Kaitlin. "Technology-dependent Quantum Logic Synthesis and Compilation" (2019); K. Fazel, M. A. Thornton, and J. E. Rice, "ESOP-based Toffoli gate cascade generation," in 2007 IEEE Pacific Rim Conference on Communications, Computers and Signal Processing. IEEE, 2007; K. Fazel, M. A. Thornton, and J. E. Rice, "ESOP-based Toffoli gate cascade generation," in 2007 IEEE Pacific Rim Conference on Communications, Computers and Signal Processing, IEEE, 2007; and Nielsen, Michael A., and Isaac Chuang. "Quantum computation and quantum information," 10th Edition (2010), which are all hereby incorporated by reference in their entirety for all purposes.

In certain embodiments, therefore, a circuit synthesis tool may be applied to a hash function to generate an equivalent reversible hash function. In particular, a circuit synthesis tool that creates a reversible function by adding additional inputs (known as ancilla) and outputs (known as garbage), and by using gates (e.g., operations) that make use of those additional inputs and outputs, may be applied to a hash function to generate an equivalent reversible hash function.

Figure 3:
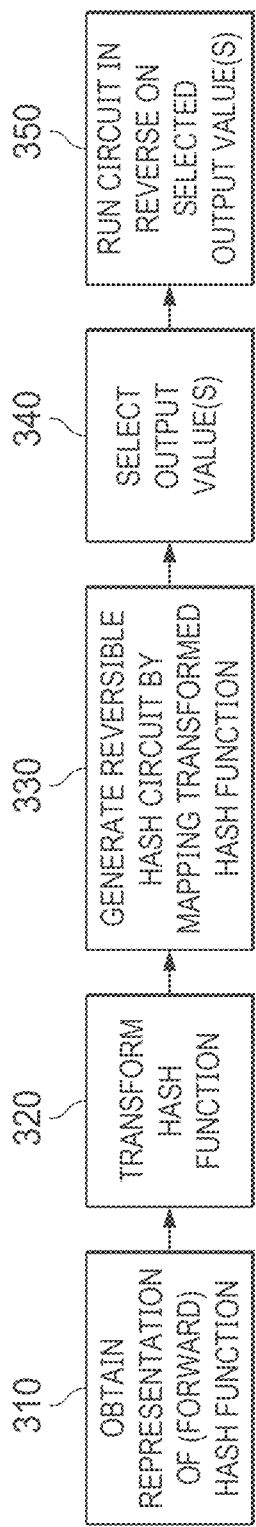
FIG. 3 is a block diagram of one embodiment of generating and utilizing a reversible hash circuit.

FIG. 3 depicts one embodiment of a method for the generation of a reversible hash function utilizing a circuit synthesis tool. Initially, a representation of a hash function may be obtained (STEP 310). The representation of the forward hash function can be transformed to a second representation of the hash function, where that second representation may represent the hash function utilizing a limited set of operations or gates (e.g., AND and Exclusive OR (XOR)) (STEP 320). The second representation of the hash function can then be mapped as a set of reversible gates (e.g., gates that may be utilized to implement a reversible function) to generate the reversible hash circuit (STEP 330).

To generate original input values from output values, the output value, or values, for which it is desired to determine an input value, or values, can be selected (STEP 340). It will be noted that if it is desired to operate in the classical domain a single (e.g., output) value may be selected while if operating the quantum domain multiple (e.g., output) values may be able to be reversed during a single operation (e.g., simultaneously) of the reversible hash circuit. Once the output value is selected, the reversible hash circuit may be run in reverse on the selected output value to generate the corresponding input value (STEP 350).

According to one embodiment then, a (first) representation of a hash function can be obtained, where it is desired to generate a reversible hash circuit for such a hash function. This representation can be, for example, formatted as an electronic design file such as a file in the .pla file format utilized for the physical description of Programmable Logic Arrays (PLAs) (hence the .pla extension) or a Hardware Description Language (HDL) file such as a structural-level Verilog HDL format (e.g., Verilog netlist). Other embodiments may utilize a decision diagram for representing the forward hash function, including binary decision diagrams or the like. While tables have been used herein for ease of representation, a person of skill in the art will understand that there are possibly more compact methods for representing switching functions other than tables such as the aforementioned representations (e.g., binary decision diagrams, textual netlists of conventional electric gates or others) and such representations are fully contemplated herein.

The .pla format was originally devised as a compact textual representation for specifying digital PLAs for physical implementation in electronic circuits and, in particular, as a file format that allowed specifications to be programmatically minimized. The .pla format can also be used to describe arbitrary functions of the form f: $B^n \rightarrow B^m$, where $B=(0,1)$, and n and m are integers.

An example of a .pla file representing a trivial function is presented in FIGS. 4A, 4B and 4C. FIG. 4A depicts a simple function translated to .pla format in FIG. 4B. Each line represents an input/output pair and can represent multiple input/output pairs, if the function has cube covering overlap. For example, the .pla in FIG. 4C can be simplified to the .pla in FIG. 4C with the introduction of hyphens (-). The hyphen in line 1 indicates that, regardless of the value of the second input, when the first input is zero, the output is also a zero. Similarly, the hyphen in line 2 indicates that, whenever the second input is a zero, the output is also zero. While this trivial example has minimal simplification, .pla files that represent larger functions with significant amounts of cube covering overlap can be significantly reduced in size through such simplification.

Using .pla files in certain embodiments is advantageous because they are intuitive to understand and can efficiently represent even very large functions if those functions have sufficient cube covering overlap between their inputs and outputs. Indeed, such cube covering overlap allows .pla files to efficiently represent some functions with over one hundred inputs and outputs.

However, in certain cases .pla files may be inherently limited, because—without cube covering overlap—the size of a .pla specification grows exponentially with respect to the number of inputs and outputs. As robust hash functions may not have overlap in input/output pairs, certain hashes may be represented as .pla files. Therefore, while .pla files are useful for certain hash functions, representing larger hash functions may be specified using a different format for particular embodiments.

For example, structural Verilog HDL netlists may allow for representing much larger functions than .pla files can accommodate, because Verilog netlists allow for multi-level specifications. Structural Verilog represents functions as an interconnection of gates that act upon inputs to produce the desired outputs. Accordingly, Verilog HDL may be a more versatile method of representing functions, given that it does not require explicitly listing each input/output pair, or even a significant fraction thereof in most cases. Thus, some embodiments may utilize Verilog HDL netlists to represent hash functions to be reversed.

Once the representation of the hash circuit to be reversed is obtained, the hash function (e.g., the representation of the hash function) can be transformed to a representation of the hash function that utilizes a limited number of functions (e.g., AND and Exclusive OR functions). The transformed representation of the forward hash function can then be utilized to generate the reversible hash circuit by mapping operations of the transformed representation to reversible gates.

In one embodiment, such a transformation and mapping may be accomplished by a circuit synthesis tool that transforms functions from a representation suitable for synthesizing classically-specified circuits into circuit descriptions appropriate for quantum computers such as tools implementing the Exclusive-Or-Sum-of-Products (ESOP) synthesis as described in Fazel, M. A. Thornton, and J. E. Rice, "ESOP-based Toffoli gate cascade generation," and K. Fazel, M. A. Thornton, and J. E. Rice, "ESOP-based Toffoli gate cascade generation." An ESOP representation of a function can thus combine input variables of the function with AND operators to make product terms that can be summed together with XOR operators.

Accordingly, the transformation and mapping of the presented hash function may be accomplished, in one embodiment, by adding additional inputs (known as ancilla) and outputs (known as garbage), and by applying gates that make use of these additional input and outputs. In particular embodiments, therefore, the representation of the hash function may be transformed and mapped to generate a circuit that uses (e.g., only) reversible gates including NOT or Pauli-X gates, Controlled-Not (C-NOT) gates and Toffoli gates. These Toffoli gates may be either 'true' Toffoli gates with only two controls or generalized Toffoli gates with three or more controls.

Figure 7:
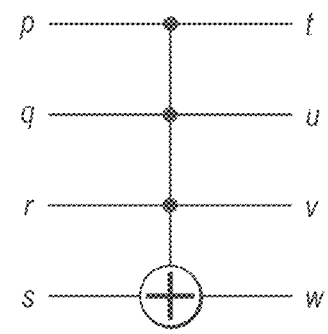
FIG. 7 depicts a representation of a circuit.

FIG. 5A depicts a truth table for a NOT (or Pauli-X) gate (or operation), while FIG. 5B depicts a commonly used representation for a NOT gate in the classical domain while FIGS. 5C and 5D are representations of a NOT operation as used in quantum circuits. FIG. 2, as mentioned above, depicts a Controlled-Not or C-NOT gate. FIG. 6 depicts a truth table and gate representation for a reversible Toffoli operation. The Toffoli operation is a controlled operation, in which a NOT is applied to r if and only if both p and q are 1. (In other words, u=~r, if p and q are both 1.) p and q are called the controls, and r is termed the target of the operation. The values of controls do not change (meaning s=p and t=4), but both values are included as outputs such that the operation is reversible. FIG. 7 depicts a truth table and circuit representation for a generalized Toffoli with three controls: p, q, and r are controls for target s; t, u, and v maintain the values of p, q, and r; and w=~s when p, q and r are all 1.

Figures 8, 9A:
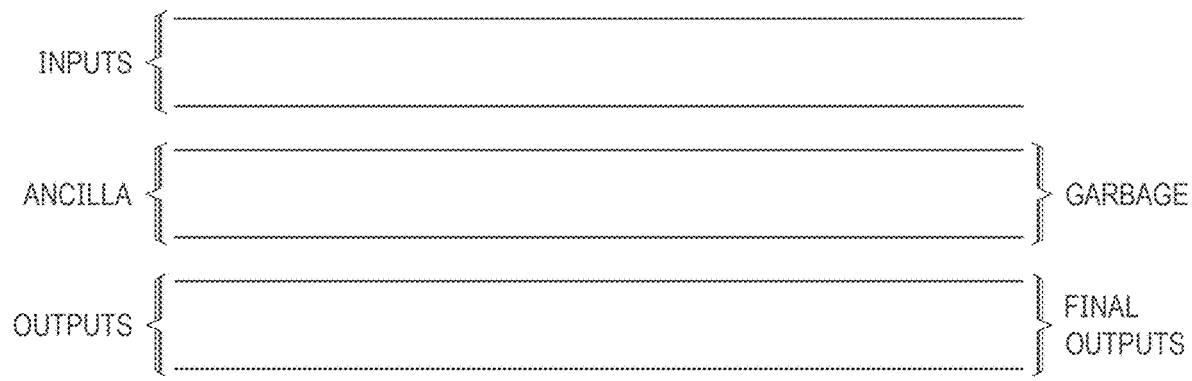

The ESOP synthesis method thus produces a reversible function wherein the originally specified irreversible function is embedded within the resulting reversible specification. The resulting circuit may comprise the original number of inputs, the original number of outputs, and may also comprise additional ancilla or garbage bits. When a computation using the generated reversible hash function is complete, the output bits contain the output values corresponding to the specified input values, and the values of any garbage outputs are ignored. This is illustrated in FIG. 8 where an example circuit with two inputs, two outputs, and two ancilla is illustrated according to an embodiment. The inputs do not change throughout the process. The ancilla and outputs may be initialized to zero, and result in 'garbage' values and the final, desired outputs, respectively.

A hash function in ESOP form may be represented as an exclusive-OR sum-of-products: function variables are combined into products via logical conjunctive AND operators, and these products are summed together with disjunctive exclusive-OR operators. When the resulting expression is evaluated at variable values, it produces the corresponding function values.

Specifically, in embodiments the hash function may be first transformed into ESOP form, meaning it comprises a list of products that produce the ESOP representation of the function when combined via exclusive-OR operators. Each row of input variable values of the table represents a product: a value of 1 or 0 corresponds to an input in positive or negative polarity, respectively, in the product. For each product, the ESOP method produces a Toffoli gate, and thereby maps a list of products to a reversible logic circuit.

The ESOP synthesis algorithm thus produces a cascade of gates that comprise the function through this mapping. In one embodiment, the steps for this mapping are as follows. For each input variable and each output variable of the ESOP-form hash function, a bit (which may be a qubit) is added to the generated circuit as an input or output. For each product comprising the function, each output value of 1 maps to a Toffoli gate with its target on the corresponding output qubit. The remaining aspects of that Toffoli gate (its controls) are determined by the inputs corresponding to the output variable: an input value of 1 means a control is placed on the corresponding input bit, while an input value of 0 means a control is placed on the corresponding input bit along with two NOT gates on either side of the control. These NOT gates reverse the bit (e.g., the bit's polarity) and then restore it for subsequent Toffoli gates.

Described another way, to generate the cascade of gates comprising the circuit, each input-output pair of the circuit may be considered. For each input output pair, for each output variable value of 1 a Toffoli gate is added to the output side of the cascade of gates being generated where the Toffoli gate target for that added Toffoli gate is on the corresponding output bit. The control for the resulting Toffoli gates are determined by the input variable values such that each value of 1 in the input variable values maps to a control on the corresponding input bit and each value of 0 maps to a control tied between two Pauli-X gates on the corresponding input bit.

As may be seen, such an ESOP synthesis may result in a large number of gates. Thus, in one embodiment, before such circuit synthesis is performed, a minimization process may be applied to the hash function to reduce the circuit size of the hash function (e.g., an ESOP representation of the hash function). For example, ESOP minimization may involve the application of a circuit minimizer such as EXORCISM-4 EXMIN2, MINT, EXORCISM-3, EXORCISM-2 or another minimizer.

Once the circuit specification is generated through the mapping, the circuit can simply be reversed to generate the reversible hash circuit. This reversal may just mean that the gate order of the circuits is swapped. For example, if gates are numbered 1,2,3, . . . , n−1, n, the reversed circuit would have gate order n, n−1, . . . 3, 2, 1.

To describe in more detail, the operation of the reversible hash circuit to obtain an input for a particular original output may be accomplished in one embodiment by first selecting the outputs for which it is desired to obtain the inputs. Next, those outputs may be placed on output lines, while as-of-yet undetermined variables are placed on the input lines (e.g., the left-hand side of the figure). Next, zeros are placed on the (e.g., right-hand side) output lines, because the outputs may be always set to begin in the zero state. It should be noted, however, that these output lines could begin in any state so long as it is known what that state is when the circuit is synthesized. For simplicity and to comply with norms in the art, zero has been utilized for purposes of this example. The as-of-yet-undetermined input values can be placed on the (e.g., right-hand-side) input lines (this is possible because embodiment may preserve the values of the inputs). The reversible nature of the circuit can then be utilized to determine what the inputs corresponding to the specified outputs are (e.g., the circuit may be run in the "reverse" direction). This process can be run classically or using quantum computation; however, in some cases running the reversal in the quantum domain may allow for more parallelization.

It may now be useful to provide an understanding of embodiments to illustrate an example of hash reversal for a four-bit hash function. Given .pla files' illustrative value, the example function is presented as a .pla, but it could also be represented as a Verilog HDL netlist, a decision diagram, or another type of representation, as previously discussed.

Figure 10:
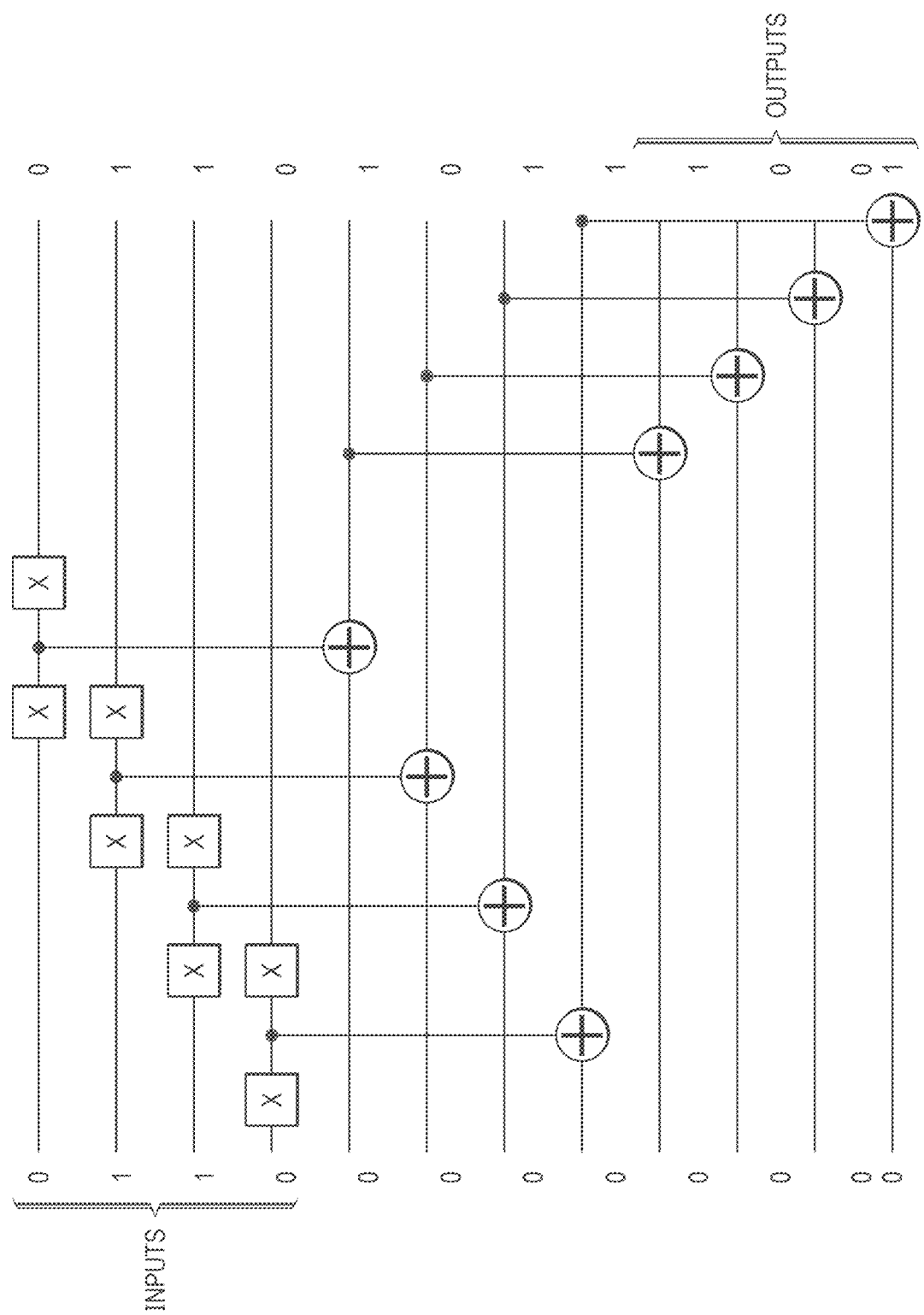
FIG. 10 depicts a representation of an example circuit according to embodiments.

Accordingly, consider the four-bit hash function presented in FIGS. 9A and 9B. For purposes of considering an illustrative example, it may be noticed that the example hash function is not particularly "strong", however the process illustrated with respect to this example may be applied equally well to other (e.g., stronger) hash functions. From the hash function represented in FIG. 9A embodiments as disclosed herein may generate the circuit presented in FIG. 9B. The relevant inputs, as well as zero values for all ancilla and outputs are sent into the circuit, as illustrated for a single input/output value pair in FIG. 10. Specifically, generating the output 1001 from input 0110 is illustrated. Notice that the inputs remain unchanged, and the ancilla are used as working values that result in 'garbage' outputs, while the final outputs contain the desired calculation. Also note that, for this trivial function, the garbage values always equal those of the outputs, but for more complex function synthesis, that may not necessarily be the case.

Figure 11:
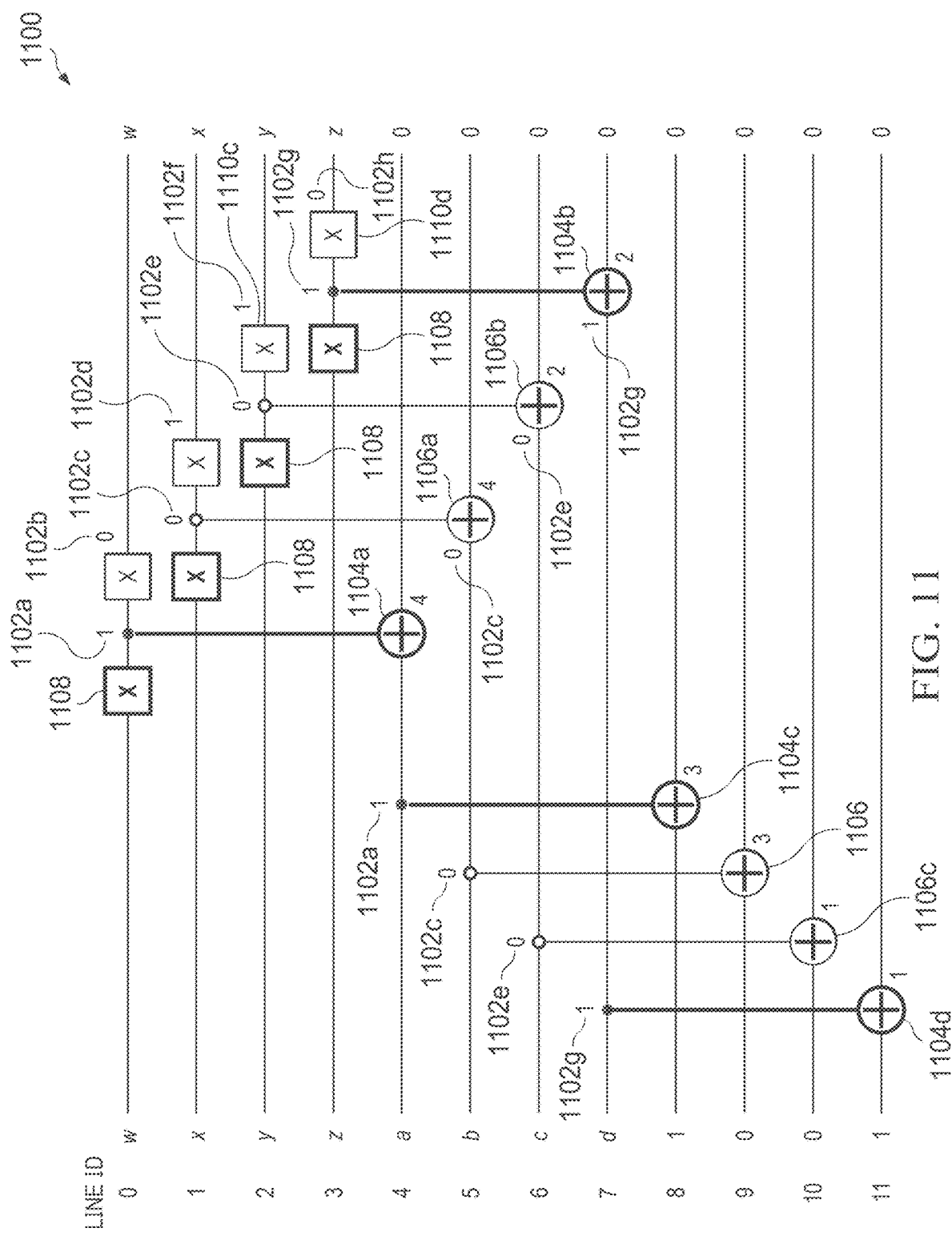
FIG. 11 depicts a representation of an example circuit according to embodiments.

Reversing the order of the gates in the circuit specification allows for working backwards from the outputs to obtain the inputs, as is illustrated in circuit 1100 FIG. 11. Specifically, what is illustrated in FIG. 11 is working backwards from outputs 1001 to obtain the input 0110 for circuit 1100. As depicted, the numerals closest to the right-hand side on lines 0, 1, 2, and 3 are the deduced input values: w=0, x=1, y=1, and z=0. The numbers indicating intermediate values of each line are as follows: values 1102a and 1102b are related to w's reversal, values 1102c and 1102d are related to x's reversal, values 1102e and 1102f are related to y's reversal, and values 1102g and 1102h are related to z's reversal. Gates 1104 are gates where the output value was flipped between '0' and '1', while gates 1106 are gates where the output was not changed.

The steps for determining the inputs from the outputs may now be described. Note that while larger functions require circuits that are more complicated, the same process applies. Referring to the left-hand side of FIG. 11, with variables w, x, y, and z representing the unknown inputs; variables a, b, c, and d representing the unknown garbage values; and the numerical values representing the known output values whose corresponding input values are desired.

On the right-hand side of FIG. 11 variables w, x, y, and z again represent the unknown inputs, while the ancilla and output values are all set to zero. It should be noted that while the inputs w, x, y, and z will be the same on both sides in the illustrated example, this is not a requirement for the reversal process, but may instead be a feature of circuit synthesis tools that may be utilized in embodiments. Instead, it is a feature that is useful in mapping functions more generally: circuit synthesis tools may be designed to restore inputs to their original values after each mid-circuit change. Similarly, initialization of all ancilla and outputs to zero is not a requirement for function reversal, but may be a design choice for function synthesis tools. Thus, it would be possible to, for example, use this same reversal procedure with ancilla or outputs initialized to non-zero values; what is important is that the initialization values be known. It will also be noted that NOT gates 1108 that occur to the left of the C-NOT gates 1104a, 1104b, 1106a, 1106b in circuit 1100 are input restoration gates that are not necessary in certain embodiments.

The inputs can be determined from the outputs because circuits created by circuit synthesis tool by mapping a circuit function to a circuit (e.g., circuit 1100) are reversible. Consequently, by working backwards, what occurs at each portion of the circuit may be ascertained to obtain the known outputs. Consider first gates 1104 and specifically, gate 1104d. Line 11 has a final output value of 1, but it started as a 0; that means that the gate 1104d flipped the value of Line 11, such that the gate's input must have been a 1. (This is denoted by the 1 value 1102g to the right of gate's (1104d) control on line 7.) Tracing line 7 to the right of the control for gate 1104d is gate 1104a. An output of a value 1102g of 1 from gate 1104a indicates that the original value of line 7 (0) was flipped. As a result, the control on line 3 for gate 1104a must have had an input value 1102g of 1. Finally, tracing line 3 to the right of the control for gate 1104a, is NOT gate 1110d. Since the output of that gate 1110d must be a value 1102g of 1, it can be determined the input to the NOT was a value 1102h of 0, and consequently, it can be determined that input z had a starting value of 0.

The same process may be used for each of the outputs, and the results are illustrated in FIG. 11. Here, one more example is described as the remainder will be understood by one of ordinary skill in the art; specifically, that of gate 1106c. Gate 1106c has a target on line 10, which has both a final and starting value of 0. This means that the control for gate 1106c, which is located on line 6, must have had an input value 1102e of 0. Tracing from that control to the beginning of line 6, the target of gate 1106b is encountered. Noting, again, that the output of that target must be the same as line 6's initial 0 value 1102e, the control for gate 1106b, which is on line 2, must have also had an input value of 0. Moving to the right from there leads to NOT gate 1110c; since the result of the NOT 1110c is a value 1102e of 0, the input value 1102f must have been 1, meaning that y=1.

The depiction and description of validation as discussed above is possible only for very small functions. For even moderately larger functions, validation may be accomplished by combining the circuit specification in the 'forward' (i.e., input to output) direction with that for the 'reversed' (i.e., output to input) direction. Verilog HDL simulation may then be utilized to verify that all of the values entered on the left side matched those output on the right side; when the combined forward and reversed circuits acted as identity for all possible input/output pairs, reversal is proven successful.

Another example may also prove useful. Looking then at FIG. 12, a .pla table representation of an example hash function identical to that of FIG. 9A is depicted along with a corresponding .pla table representation of the minimized ESOP form of that same function is depicted. An example of the ESOP synthesis of a reversible hash circuit from that hash function is depicted in FIGS. 13A-13D.

Recall that to generate the cascade of gates comprising the ESOP version of the circuit, each input-output pair of the circuit may be considered. For each input output pair considered, for each output variable value of 1 for that pair a Toffoli gate is added to the output side of the cascade of gates being generated, where the Toffoli gate target for that added Toffoli gate is on the corresponding output bit. The control for the resulting Toffoli gates are determined by the input variable values of that input-output pair such that each value of 1 in the input variable values maps to a control on the corresponding input bit and each value of 0 maps to a control tied between two Pauli-X gates on the corresponding input bit.

Figure 12:
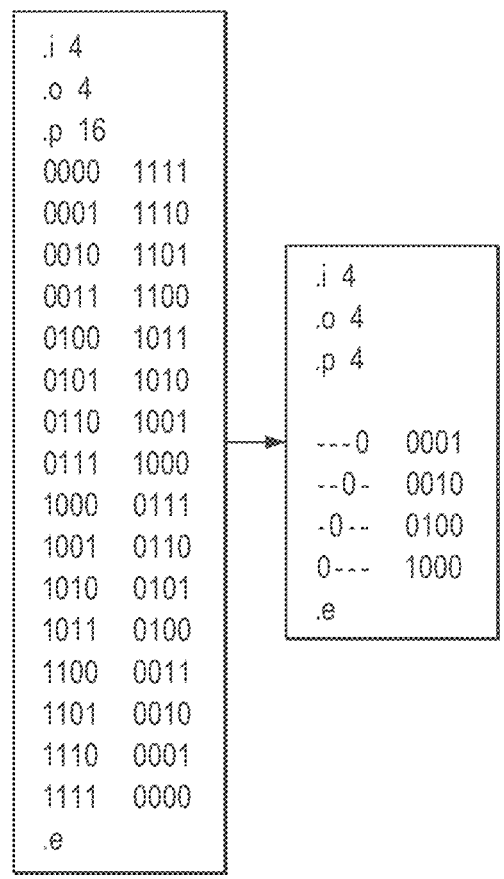
FIG. 12 depicts a representation of an example minimized hash function.
Figure 13B:
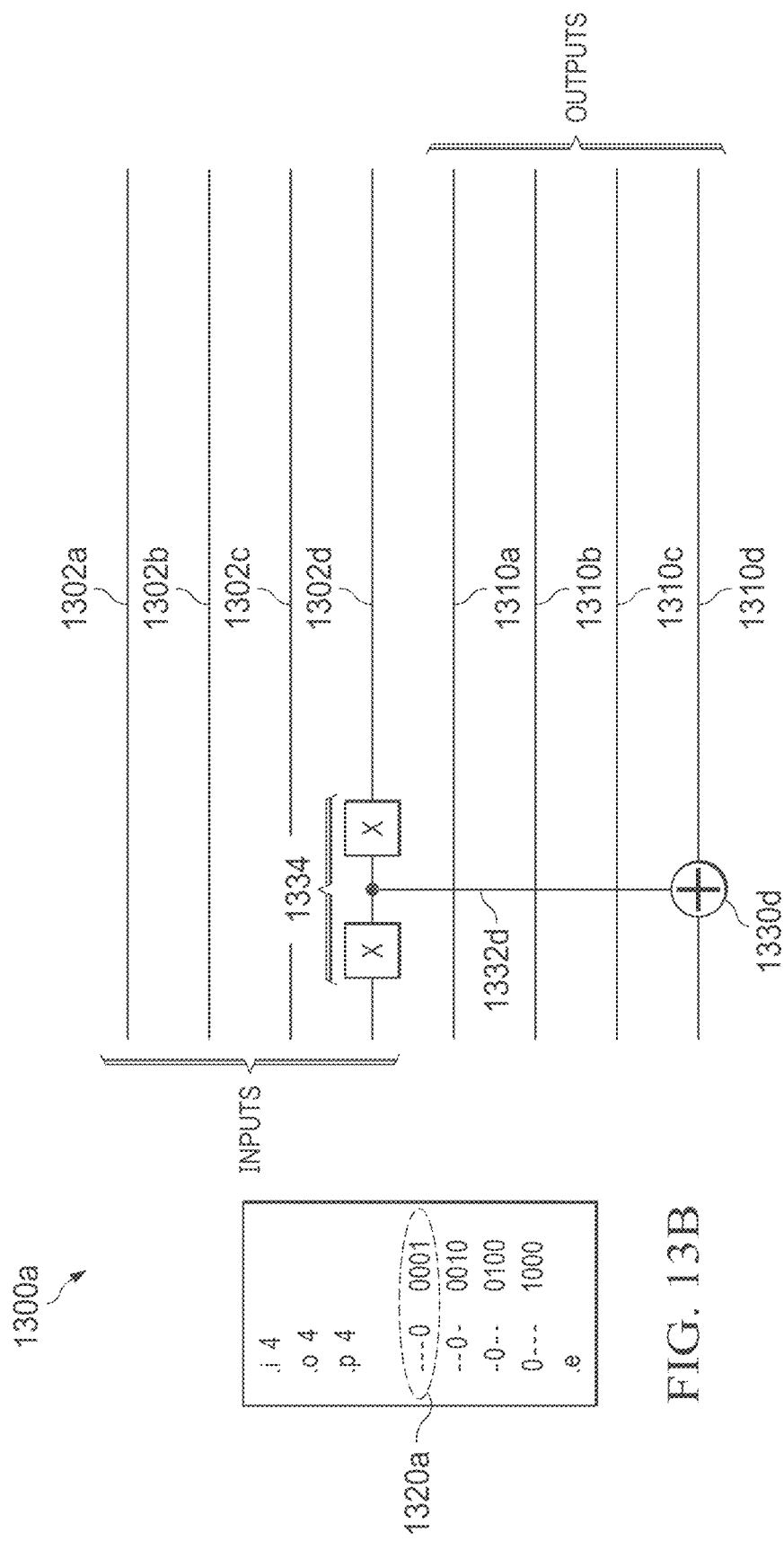

Thus, first with reference to FIG. 13A, the reversible circuit 1300a to be generated for the hash function as depicted in FIG. 12 may include four input lines 1302 (1302a, 1302b, 1302c, 1302d) and four output lines 1310 (1310a, 1310b, 1310c, 1310d). This generation may comprise processing each input-output value pair of the representation, and the inclusion of corresponding gates in the circuit 1300a based on that input-value pair. In FIG. 13B, the determination and inclusion of gates in circuit 1300a for a first input-output pair 1320a of the function representation for the hash is depicted. Here, the input value of pair 1320a is - - - 0 (e.g., corresponding respectively to input lines 1302a, 1302b, 1302c, 1302d while the output value of the pair is 0001 (e.g., corresponding respectively to output lines 1310a, 1310b, 1310c, 1310d). It will be understood that each hyphen or dash in the representation of the input value of the pair may be effectively ignored for purposes of inclusion of gates in the circuit 1300a because either input value (0 or 1) on the input lines corresponding to those dashes will map to the corresponding output value of that output pair.

Thus, for each bit in that output value of the pair that is 1, a controlled gate is included in circuit 1300a where the target of that gate is going to be on the output line 1310 in circuit 1300a that corresponds to that bit. For this first input-output pair 1320a that corresponds to the last output line 1302d because the 1 is in the last place of the output value. Thus, (e.g., CNOT or Toffoli) gate 1330d is included in circuit 1300a on output line 1302d based on the 1 value in the last place of the output value.

The values of the corresponding input value of the input-output value pair (here - - - 0) can then be evaluated to determine where the control lines for any added control gates are to be added. Specifically, dashes in the input value may be ignored, any time there is a 1 in the input value a control line to the added gate from the input line 1302 corresponding to that 1 value may be added to circuit 1300a, while if there is a 0 in the input value a control line between two NOT gates may be added to the circuit 1300 to control the added controlled gate. Thus, for the input-output pair illustrated in FIG. 13B, there is a 0 in the place of the input value corresponding to input line 1302d. Thus, control line 1332d for gate 1330d may be added (coupled) between two NOT gates 1334 on input line 1302d.

In FIG. 13C, the determination and inclusion of gates in circuit 1300a for a second input-output pair 1320b of the function representation for the hash is depicted. Here, the input value of pair 1320b is - - 0- (e.g., corresponding respectively to input lines 1302a, 1302b, 1302c, 1302d) while the output value of the pair is 0010 (e.g., corresponding respectively to output lines 1310a, 1310b, 1310c, 1310d).

Thus, for each bit in that output value of the input-output pair that is 1, a controlled gate is included in circuit 1300a where the target of that gate is going to be on the output line in circuit 1300 that corresponds to that bit. For this second input-output pair 1320b that corresponds to the output line 1302c because the 1 is in the second to last output place of the output value. Thus, (e.g., CNOT or Toffoli) gate 1330c is included in circuit 1300a on output line 1302c based on the 1 value in the second to last place of the output value.

The values of the corresponding input value of the input-output value pair (here - - 0-) can then be evaluated to determine where the control lines for added control gate 1330c are to be added (coupled). For the input-output pair illustrated in FIG. 13C, there is a 0 in the place of the input value corresponding to input line 1302c. Thus, control line 1332c for gate 1330c may be added (coupled) between two NOT gates 1334 on input line 1302c.

Figure 13D:
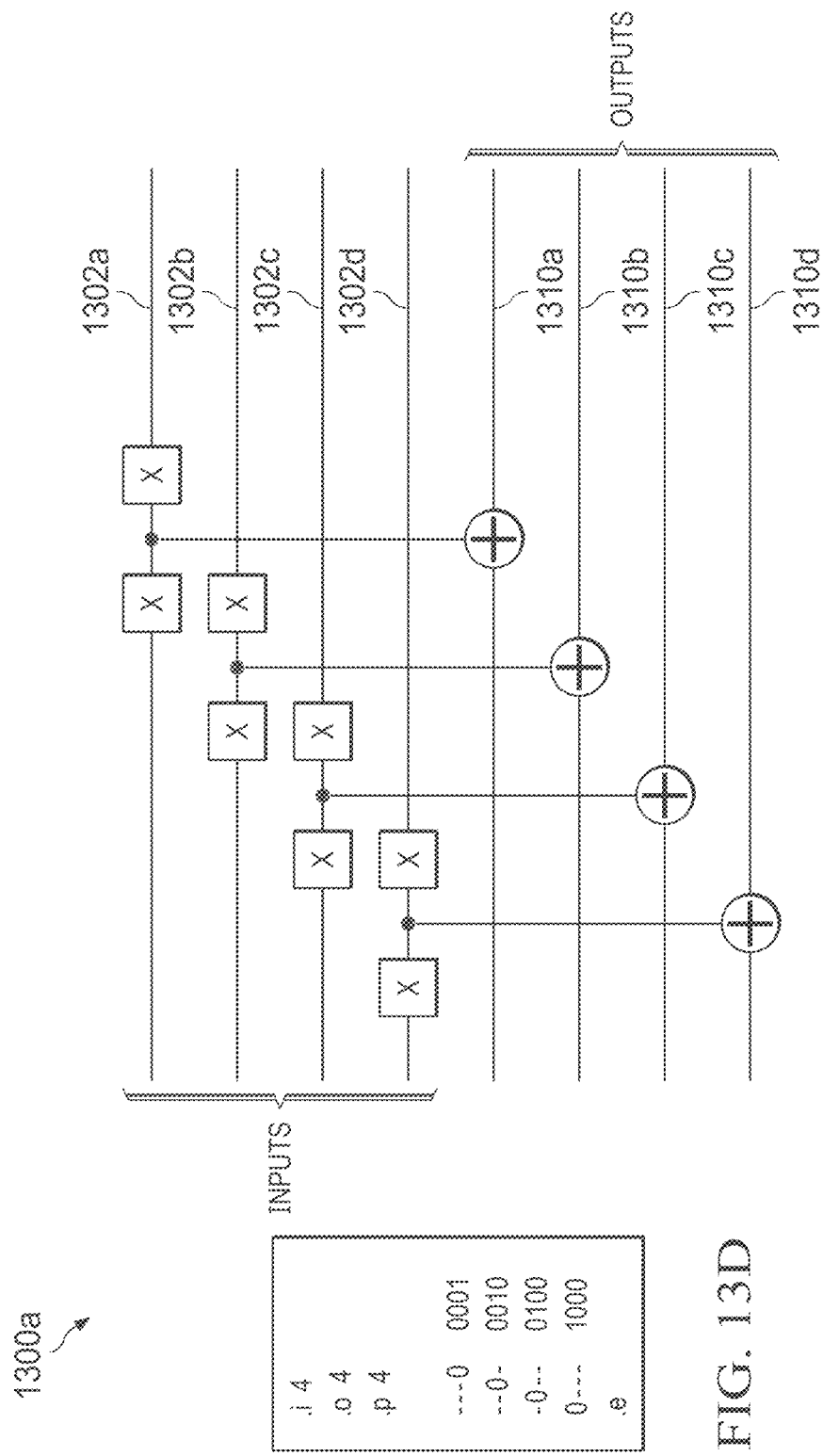

The remaining input-output pairs of the representation may then be evaluated and gates added to circuit 1300a in a similar manner, resulting in reversible hash circuit 1300a for the hash function of the representation. This reversible hash circuit is depicted in FIG. 13D.

Figure 13E:
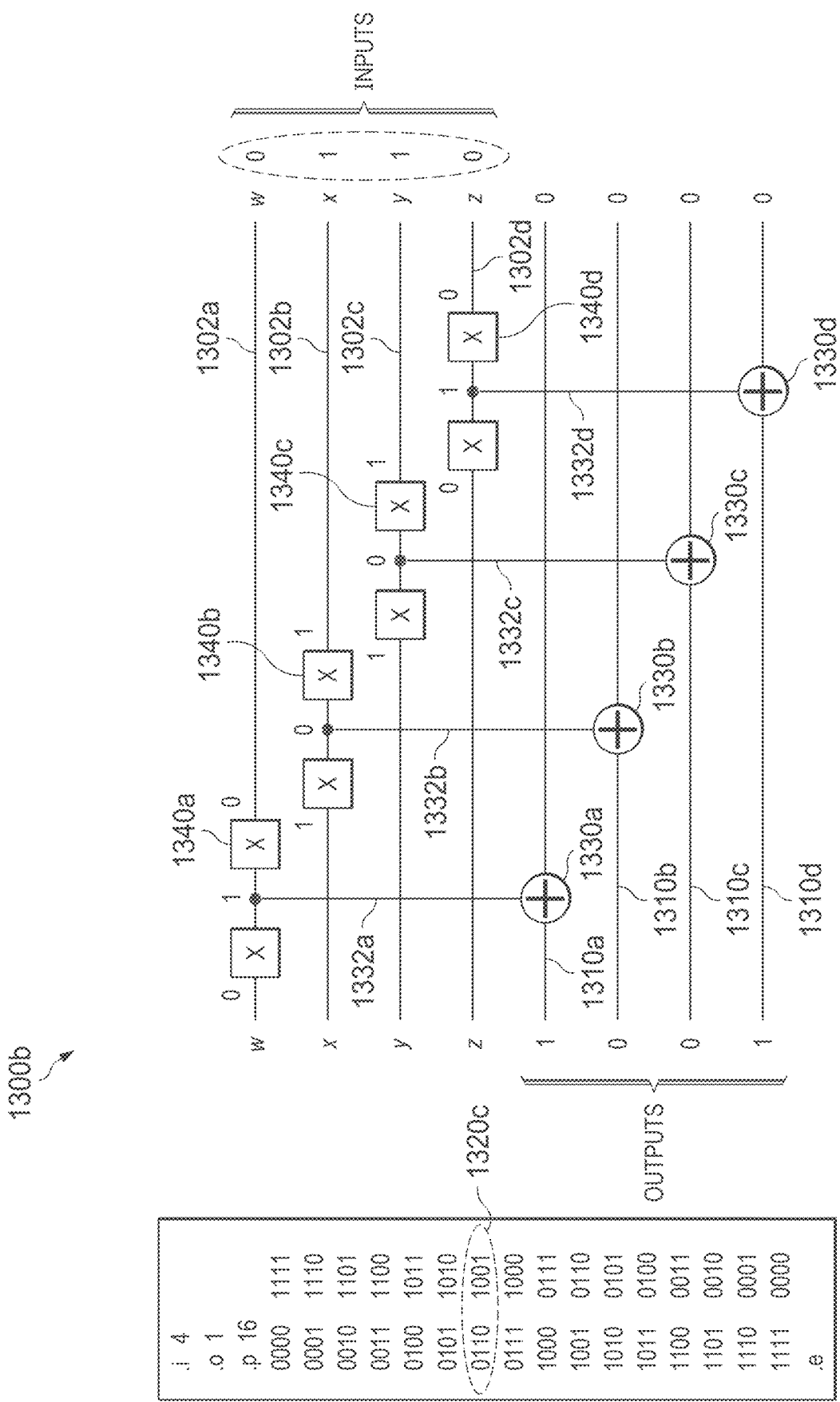

An example of the operation of the reversible hash circuit generated in FIGS. 13A-13D in an inverted or reverse manner to generate input values for a selected output value is depicted in FIG. 13E. Here, the outputs 1310 of the circuit 1300b are now depicted on the left of each figure and the inputs 1302 of circuit 1300b are on the right of each figure. In other words, an input value (e.g., the set of bit values on input lines 1302) to the reversible hash circuit 1300 that yielded the output value (e.g., the set of bit values in output lines 1310) when operating the hash function in a forward direction will be the result of providing that output value of that input-output value pair to circuit 1300b on output lines 1310 when circuit 1300b is operated in the reverse direction.

Thus, when it is desired to operate hash circuit 1300b in a reverse manner to obtain an input value for a given input-output pair, the output value of the input-output value pair may be selected and provided as input to circuit 1300b on output lines 1310. For illustrative purposes of this example, the output value 1001 of input-output value pair 1320c has been selected. It should be noted that all input-output pair values of the hash function corresponding to circuit 1300b have been illustrated in FIG. 13E (instead of just the minimized representation of the function) for ease of understanding. Additionally, while input values of each of the input-output value pairs are depicted here for illustrative purposes, it will be apparent that when it is desired to reverse such a function based on an output value, such input values will usually not be available, as those are the input values it is desired to generate.

Thus, once an output value has been selected (e.g., here 1001), that output value of the input-output value pair can be provided as input to circuit 1300b on output lines 1310 where it is desired to operate circuit 1300b to generate the corresponding input value of the input-output value pair 1320c for the hash function on input lines 1302 of circuit 1300b. Again, as is standard in the art, the output of circuit 1300b will be held at zeros for purposes of illustration.

Accordingly, illustrating the operation of circuit 1300b in a reverse operation, looking first at output line 1310a, a 1 is provided as input on this output line 1310a and the resulting output on output line 1310a is a 0. This means that gate 1330a must have been controlled to flip the value on output line 1310a from 1 to 0. Accordingly, the value on control line 1332a for gate 1330a must have been 1. Thus, NOT gate 1340a would flip such a 1 value to 0 and the output value on input line 1302a (w) would also be 0.

Similarly, a 0 is provided as input on output line 1310b and the resulting output on output line 1310b is a 0. This means that gate 1330b must not have flipped the value on output line 1310b. Accordingly, the value on control line 1332b for gate 1330b must have been 0. Thus, NOT gate 1340b would flip such a 0 value to 1 and the output value on input line 1302b (x) would be a 1.

Likewise, a 0 is provided as input on output line 1310c and the resulting output on output line 1310b is a 0. This means that gate 1330c must not have flipped the value on output line 1310b. Accordingly, the value on control line 1332c for gate 1330c must have been 0. Thus, NOT gate

1340c would flip such a 0 value to 1 and the output value on input line 1302b (y) would be a 1.

On output line 1310d a 1 is provided as input where the resulting output on output line 1310d is a 0. This means that gate 1330d must have been controlled to flip the value on output line 1310d from 1 to 0. Accordingly, the value on control line 1332d for gate 1330d must have been 1. Thus, NOT gate 1340d would flip such a 1 value to 0 and the output value on input line 1302d (z) would also be 0.

As can be seen then, by running circuit 1300b in a reverse manner and providing the output value 1001 as input to circuit 1300b on output lines 1310, the result is corresponding input value 0110 produced as output on input lines 1302, where that input value 1110 corresponds to the output value 1001 in input-out pair 1320c.

As such, embodiments may provide systems and methods for efficiently generating inverse hash functions. Efficiently reversing hashes according to embodiments may have a number of applications which may be important (e.g., to the cybersecurity community). For example, participating in blockchain ecosystems (including cryptocurrency mining), decrypting website credentials, and impersonating cryptographic signatures all involve hashes. Embodiments as described herein may generate a circuit that directly calculates an inverse hash, thus bypassing the massive set of forward-hash computations involved in a brute-force search. Furthermore, embodiments may be especially suitable for tasks involving fixed size hashes—such as those used in blockchains or in cryptographic signatures for a fixed size message (such as a single bank transaction)—because the hash reversal circuit may not need to be resynthesized in real time.

It may thus be useful to describe some of these applications. As but one, embodiments may apply to a blockchain application, such as cryptocurrency mining. Such mining involves attempting to reverse a hash function that is calculated on a specific blockchain database. Once the hash function has been reversed, it is used to create a "Proof-of-Work" (PoW) that validates the integrity of the given blockchain entry. This mining process typically requires significant computational resources, given that classical computers are often required to perform a brute-force search—which requires computing all of the possible forward hash results for a given blockchain entry—to obtain the reverse of the blockchain signature. As mentioned above, applying embodiments as described herein would avoid such an exhaustive search.

Almost any quantum or classical data processing system desired may be utilized to implement embodiments as disclosed. Such data processing systems may include one or more central processing units (CPU) or processors coupled to one or more user input/output (I/O) devices or memory devices. Examples of I/O devices may include, but are not limited to, keyboards, displays, monitors, touch screens, printers, electronic pointing devices such as mice, trackballs, styluses, touch pads, or the like. Examples of memory devices may include, but are not limited to, hard drives (HDs), magnetic disk drives, optical disk drives, magnetic cassettes, tape drives, flash memory cards, random access memories (RAMs), read-only memories (ROMs), smart cards, etc.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including Python. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The functions of the invention can be achieved in many ways. The invention may be implemented by using software programming or code in one or more computers, by using application specific integrated circuits, programmable logic devices, field programmable gate arrays, optical, chemical, biological, quantum or nano-engineered systems, or many such other computational mechanisms or a combination of the methods listed earlier. Also, the invention may also be implemented using distributed or networked systems, components, and circuits. In distributed system embodiments, communications or transfer (or otherwise moving from one place to another) of data may be accomplished by wired, wireless, offline storage of partial results or by any other similar means.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise. The scope of the present disclosure should be determined by the following claims and their legal equivalents.

Although the invention has been described with respect to specific embodiments thereof, these embodiments are merely illustrative, and not restrictive of the invention. Reference throughout this specification to "one embodiment," "an embodiment," or "a specific embodiment," "a specific implementation," or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for generating a reversible hash circuit, comprising:
    a processor;
    a non-transitory computer readable medium, comprising instruction for:
        obtaining a first representation of a hash function;
        transforming the first representation of the hash function to a second representation of the hash function; and
        generating a reversible hash circuit for the hash function by mapping the second representation of the hash function to a set of reversible gates comprising the reversible hash function.

2. The system of claim 1, wherein the first representation is a Programmable Logic Array (PLA), a netlist, or a decision tree.

3. The system of claim 1, wherein the second representation is an Exclusive-Or-Sum-of-Products (ESOP) representation.

4. The system of claim 3, wherein the instructions are further for minimizing the second representation before generating the reversible hash circuit.

5. The system of claim 1, wherein the instructions are further for: operating the reversible hash circuit by providing an output value of the hash function as input to the reversible hash circuit and operating the reversible hash circuit in a reverse direction to obtain an input value corresponding to that output value.

6. The system of claim 5, wherein the reversible hash circuit is operated in a classical domain or a quantum domain.

7. The system of claim 6, wherein the reversible circuit is operated in the quantum domain, the output value comprises a set of output values, and the obtained input value comprises multiple input values, each input value corresponding to one of the set of output values.

8. A method for generating a reversible hash circuit, comprising:
   obtaining a first representation of a hash function;
   transforming the first representation of the hash function to a second representation of the hash function; and
   generating a reversible hash circuit for the hash function by mapping the second representation of the hash function to a set of reversible gates comprising the reversible hash function.

9. The method of claim 8, wherein the first representation is a Programmable Logic Array (PLA), a netlist, or a decision tree.

10. The method of claim 8, wherein the second representation is an Exclusive-Or-Sum-of-Products (ESOP) representation.

11. The method of claim 10, wherein the instructions are further for minimizing the second representation before generating the reversible hash circuit.

12. The method of claim 8, further comprising operating the reversible hash circuit by providing an output value of the hash function as input to the reversible hash circuit and operating the reversible hash circuit in a reverse direction to obtain an input value corresponding to that output value.

13. The method of claim 12, wherein the reversible hash circuit is operated in a classical domain or a quantum domain.

14. The method of claim 13, wherein the reversible circuit is operated in the quantum domain, the output value comprises a set of output values, and the obtained input value comprises multiple input values, each input value corresponding to one of the set of output values.

15. A non-transitory computer readable medium, comprising instructions for generating a reversible hash circuit, comprising:
   obtaining a first representation of a hash function;
   transforming the first representation of the hash function to a second representation of the hash function; and
   generating a reversible hash circuit for the hash function by mapping the second representation of the hash function to a set of reversible gates comprising the reversible hash function.

16. The non-transitory computer readable of claim 15, wherein the first representation is a Programmable Logic Array (PLA), a netlist, or a decision tree.

17. The non-transitory computer readable of claim 15, wherein the second representation is an Exclusive-Or-Sum-of-Products (ESOP) representation.

18. The non-transitory computer readable of claim 17, wherein the instructions are further for minimizing the second representation before generating the reversible hash circuit.

19. The non-transitory computer readable of claim 15, wherein the instructions are further for: operating the reversible hash circuit by providing an output value of the hash function as input to the reversible hash circuit and operating the reversible hash circuit in a reverse direction to obtain an input value corresponding to that output value.

20. The non-transitory computer readable of claim 19, wherein the reversible hash circuit is operated in a classical domain or a quantum domain.

21. The non-transitory computer readable of claim 20, wherein the reversible circuit is operated in the quantum domain, the output value comprises a set of output values, and the obtained input value comprises multiple input values, each input value corresponding to one of the set of output values.

* * * * *